US012593816B2

(12) United States Patent

Karp et al.

(10) Patent No.: US 12,593,816 B2

(45) Date of Patent: Apr. 7, 2026

(54) PET CALMING DEVICE

(71) Applicant: HB Innovations, Inc., Los Angeles, CA (US)

(72) Inventors: Harvey N. Karp, Los Angeles, CA (US); Peter Fornell, Los Angeles, CA (US)

(73) Assignee: HB Innovations, Inc., Los Angeles, CA (US)

( * ) Notice: Subject to any disclaimer, the term of this patent is extended or adjusted under 35 U.S.C. 154(b) by 229 days.

(21) Appl. No.: 17/692,834

(22) Filed: Mar. 11, 2022

(65) Prior Publication Data

US 2022/0287268 A1    Sep. 15, 2022

Related U.S. Application Data

(60) Provisional application No. 63/160,117, filed on Mar. 12, 2021.

(51) Int. Cl.
    *A01K 1/035*     (2006.01)
    *A01K 1/00*     (2006.01)

(52) U.S. Cl.
    CPC ............ *A01K 1/035* (2013.01); *A01K 1/0076* (2013.01)

(58) Field of Classification Search
    CPC .... A01K 1/035; A01K 1/0076; A01K 1/0353; A01K 1/0082; A01K 1/0158; A01K 1/0157; A01K 13/00; A01K 29/00; A61H 7/007; A61H 2203/03
    USPC ........................................................ 119/28.5
    See application file for complete search history.

(56) References Cited

U.S. PATENT DOCUMENTS 1,890,163 A * 12/1932 Mann ................... A01K 1/0353
    119/28.5
2,612,585 A * 9/1952 McCann ............... H05B 3/342
    338/276
2,659,344 A * 11/1953 Herbert ................. A01K 1/035
    119/515

(Continued)

FOREIGN PATENT DOCUMENTS

CN      104719178      6/2015
CN      106213878 A * 12/2016

(Continued)

OTHER PUBLICATIONS

Petzu Heart Pillow, https://www.chewy.com/petzu-heartbeat-dog-pillow/dp/118068?utm_source=google-product&utm_medium=cpc&utm_campaign=hg&utm_content=PetZu&utm_term=&gclid=CjwKCAjwi_b3BRAGEiwAemPNU5vL_-5041JFcmPVvFVPfZd562W3TglhMeEqgRPPSimRe3VybnmgxxoCKIsQAvD_BWE, printed Aug. 17, 2022.

(Continued)

*Primary Examiner* — Zoe Tam Tran

(74) *Attorney, Agent, or Firm* — Blank Rome

(57) ABSTRACT

A pet calming system may include a pet bed including one or more of a breathing device, a massage device, a sound generator, or a heater. The breathing device may be configured to simulate breathing along at least a portion of an interior side of one or more sidewalls of the bed. The massage device may provide a massaging motion along at least a portion of the interior side of the one or more sidewalls. The sound generator may output sound into a bed space of the bed. The heater may provide heat along at least a portion of an interior side of the one or more sidewalls, a base of the bed or both.

20 Claims, 9 Drawing Sheets

(56) References Cited

U.S. PATENT DOCUMENTS

| 3,419,923 | A | * | 1/1969 | Cowan | A47D 15/001 |
| | | | | | 607/104 |
| 5,357,642 | A | | 10/1994 | Clute | |
| 6,224,563 | B1 | * | 5/2001 | Nonoue | A61H 15/0078 |
| | | | | | 601/111 |
| 6,237,531 | B1 | * | 5/2001 | Peeples | A01K 1/0353 |
| | | | | | D30/118 |
| 6,622,652 | B1 | * | 9/2003 | Wang | A01K 1/0353 |
| | | | | | 119/28.5 |
| 8,220,089 | B1 | * | 7/2012 | Diefenbach | A47D 9/00 |
| | | | | | 5/655 |
| 2004/0177450 | A1 | | 9/2004 | Salvatini et al. | |
| 2004/0189475 | A1 | | 9/2004 | Cooper et al. | |
| 2008/0022935 | A1 | * | 1/2008 | Fine | A01K 1/0353 |
| | | | | | 119/28.5 |
| 2008/0066687 | A1 | * | 3/2008 | Leung | A01K 1/0245 |
| | | | | | 119/28.5 |
| 2011/0144416 | A1 | * | 6/2011 | Waddell | A47D 9/057 |
| | | | | | 600/26 |
| 2011/0197823 | A1 | * | 8/2011 | Pietra | A01K 1/0353 |
| | | | | | 119/497 |
| 2012/0263331 | A1 | * | 10/2012 | Newman | A01K 1/0353 |
| | | | | | 381/333 |
| 2013/0247828 | A1 | * | 9/2013 | Tedaldi | A01K 1/0353 |
| | | | | | 119/28.5 |
| 2013/0324788 | A1 | * | 12/2013 | Holley | A61M 16/06 |
| | | | | | 128/202.16 |
| 2014/0230735 | A1 | * | 8/2014 | Coulter | A01K 1/0353 |
| | | | | | 119/28.5 |
| 2015/0040315 | A1 | | 2/2015 | Gersin | |
| 2017/0251629 | A1 | * | 9/2017 | Hickman-Miller | A01K 1/035 |
| 2020/0331510 | A1 | | 10/2020 | Kim | |
| 2021/0378210 | A1 | * | 12/2021 | Hirsch | A01K 1/0353 |

FOREIGN PATENT DOCUMENTS

| CN | 107224397 | | 10/2017 |
| CN | 107468493 | A * | 12/2017 |

OTHER PUBLICATIONS

Lectrofan High Fidelity White Noise Machine, https://www.amazon.com/dp/B00E6D6LQY?tag=tdt01-20&linkCode=ogi&th=1&psc=1, printed Aug. 17, 2022.

Aleko Soft Heated Padded Pet Bed, https://www.alekoproducts.com/marketplace/pets/soft-heated-padded-pet-bed-19x19x7-inches-white-gray-small/phbed17s-ap/?utm_source=google&utm_medium=cpc&gclid=CjwKCAjwi_b3BRAGEiwAemPNU6fSJZ-kAagGGA9O9anVPOOZ9zUgaK-7udzvxXbgk7mPdNZtbqoFuxoCdrMQAvD_BwE, printed Aug. 17, 2022.

International Search report and Written Opinion, PCT/US2022/0374225, May 17, 2022.

* cited by examiner

PET CALMING DEVICE

CROSS-REFERENCE TO RELATED APPLICATIONS

This application claims priority benefit to U.S. Provisional Application No. 63/160,117, filed Mar. 12, 2021, which is incorporated herein by reference in its entirety.

TECHNOLOGY

The present disclosure is directed to pet calming devices including beds for pets and accessory calming features for beds for pets.

BACKGROUND

Pets typically spend the majority of their day sleeping. When pets are young, these animals may sleep even longer. For example, puppies and kittens may spend 20 or more hours a day sleeping. While pets typically have little trouble locating a spot to catch some sleep, many pets find routine comforting and will return to a handful of preferred sleeping spots. Many pets also find comfort in having a dedicated bed of their own for sleeping and general resting. As a consequence, a pet bed is a common sight in pet owner homes.

Juvenile dogs and cats are usually separated from their mother within 12 weeks but in many situations may be separated much sooner. In either instance, the separation may stress the juvenile animal. The stress may adversely affect behavior, sleep, and, consequently, development. However, little focus has been paid to reducing this stress and improving sleep and general comfort.

What is need are improved pet calming devices including pet beds that enhance pet comfort and satisfaction.

SUMMARY

In one aspect, a pet calming system may include a pet bed including one or more of a breathing device, a massage device, a sound generator, or a heater. The breathing device may be configured to simulate breathing along at least a portion of an interior side of one or more sidewalls of the bed. The massage device may provide a massaging motion along at least a portion of the interior side of the one or more sidewalls. The sound generator may output sound into a bed space of the bed. The heater may provide heat along at least a portion of an interior side of the one or more sidewalls, a base of the bed or both.

In one aspect, a pet calming system includes a pet bed and one, more, or all of a breathing device, a sound generator, a heater, and a massage device. The pet bed may include a base, one or more sidewalls extending around the base, and a bed space defined by the base and an interior side of the one or more sidewalls. The breathing device may be configured to simulate breathing along at least a portion of the interior side of the one or more sidewalls. The sound generator may be configured to output sound into the bed space. The heater may be configured to provide heat along at least a portion of the interior side of the one or more sidewalls, base, or both. The massage device may be configured to provide a massaging motion along at least a portion of the interior side of the one or more sidewalls.

In one example, the pet bed further includes a roof configured to extend over at least a portion of the bed space. In one configuration, the roof comprises an eave. In a further configuration, the roof pivotable over the bed space between an open position and one or more partially open positions and/or a closed position.

In the above example or another example, the interior side of the one or more sidewalls is rounded toward the bed space.

In any of the above examples or another example, the one or more sidewalls or a liner thereof comprises a plush cleanable fabric.

In any of the above examples or another example, the breathing device comprises one or more inflatable bladders.

In any of the above examples or another example, the massage device comprises a plurality of fingers, and the massaging motion comprises the plurality of fingers moving up and down in a kneading motion.

In any of the above examples or another example, the sound output comprises white noise.

In any of the above examples or another example, the sound generator outputs white noise responsive to sound or movement detected within the bed space by one or more sensors.

In any of the above examples or another example, the system includes a controller configured to control operations of the breathing device, sound generator, heater, and massage device.

In one configuration, the controller is configured to receive instructions from a user interface that allows a user to selectively turn off the breathing device, sound generator, heater, and/or massage device.

In the above or another configuration, the controller is configured to receive instructions from a user interface that allows a user to define operation parameters of the breathing device, sound generator, heater, and/or massage device.

In any of the above configurations or another configuration, the controller is configured to receive instructions from a user interface that allows a user to selectively turn off the breathing device and/or sound generator. In a further configuration, the user interface comprises a dedicated remote. In a further or another configuration, the user interface comprises a mobile app. executable on a smart phone.

In any of the above examples or another example, the system further includes a rechargeable battery.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIGS. 9A & 9B illustrate a pet calming system including a pet bed and a heater wherein FIG. 9A is a cross-section view according to various embodiments described herein;

DETAILED DESCRIPTION

The present disclosure describes various embodiments of a pet calming system. The pet calming system may include a pet bed and be configured to calm, relax, induce sleep, and/or comfort a pet when positioned within the pet bed. The pet calming system may be used for adult, adolescent, or juvenile pets, such as dogs and cats. The pet calming system may be especially beneficial to juvenile pets such as puppies and kittens. The pet calming system may include one or more features selected from a roof, breathing function, sound output, heater, and a message function.

Figure 1:
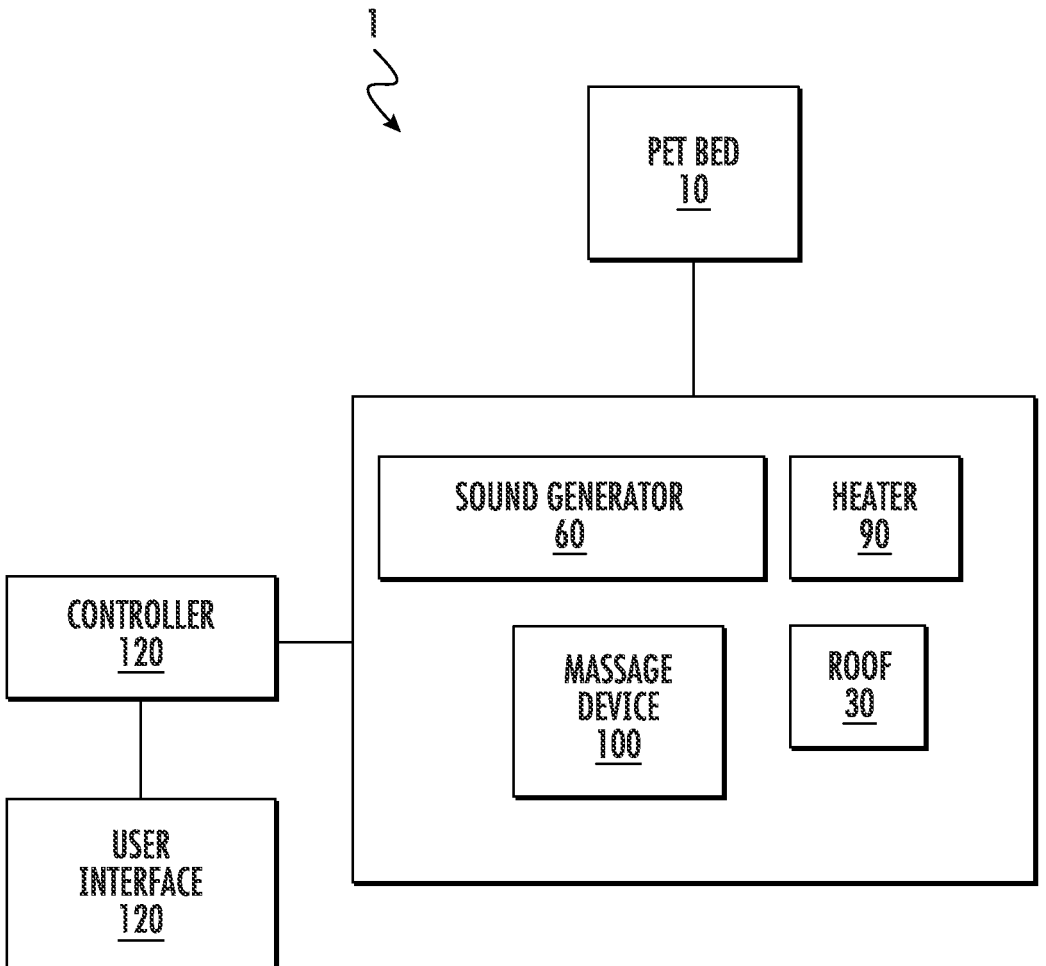
FIG. 1 schematically illustrates a pet calming system according to various embodiments described herein.

FIG. 1 illustrates a pet calming system 1 according to various embodiments. The pet calming system 1 includes a pet bed 10 (see, e.g., FIGS. 2A & 2B) and various optional features including a roof 30 (see, e.g., FIGS. 3-6), a breathing device 60 (see, e.g., FIGS. 7A-7E), a sound generator 80 (see, e.g., FIG. 8), a heater 90 (see, e.g., FIGS. 9A & 9B), a massage device 100 (see, e.g., FIGS. 10A & 10B), and a controller 110 configure to control operations of the pet calming system 1. The system 1 may further include or be operable with a user interface 120 configured to interface a user with the controller 110 to control operations of the pet calming system 1.

FIGS. 2A-11 illustrate various exemplary embodiments of the pet calming system 1 and various accessories features thereof wherein like numbers identify like features.

Figure 2A:
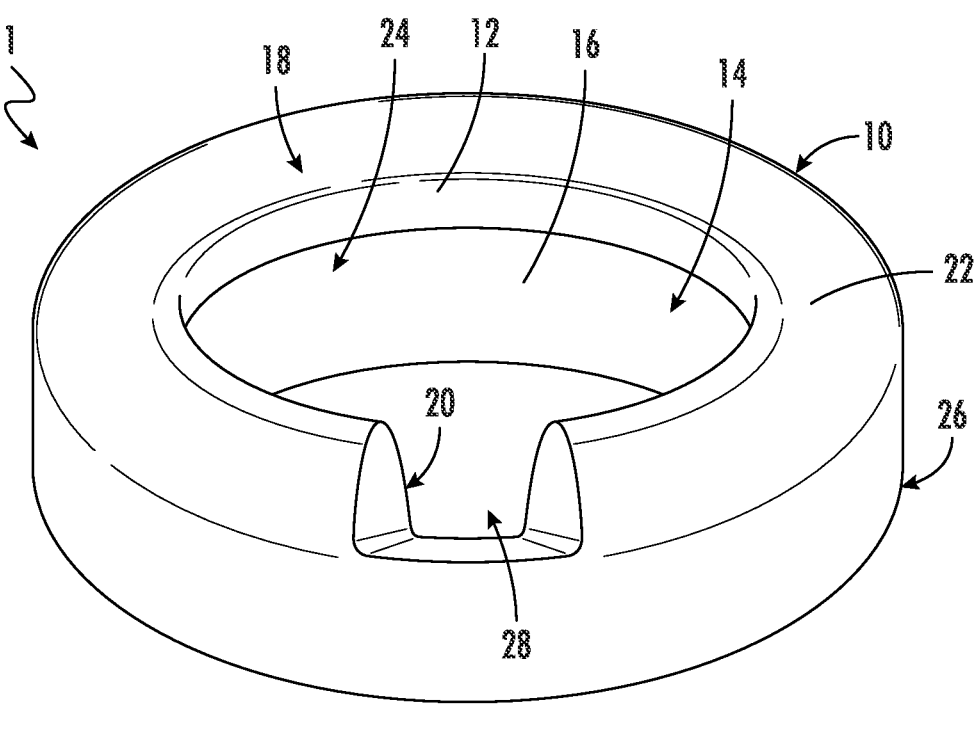
FIGS. 2A & 2B illustrate pet beds for a pet calming system according to various embodiments described herein.
Figure 2B:
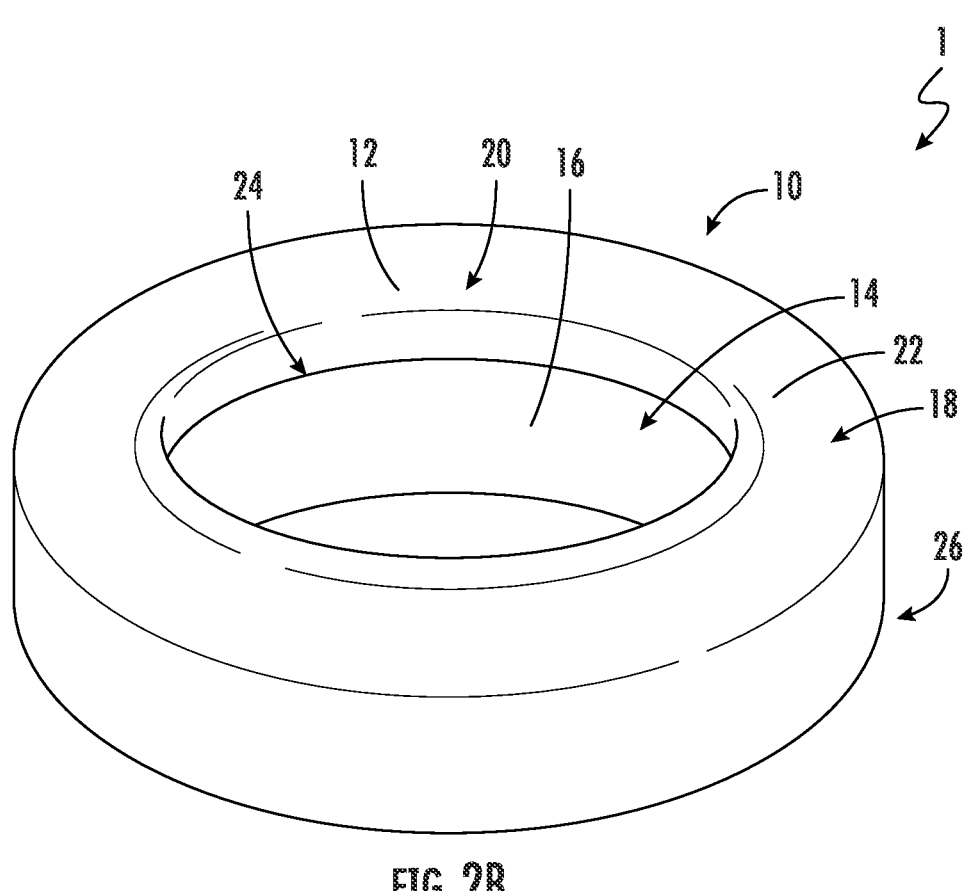

FIGS. 2A & 2B illustrate two configurations of a pet bed 10 of a pet calming system 1 according to various embodiments described herein. The pet bed 10 may include one or more sidewalls 12 that define a bed space 14 appropriately sized for a pet. The one or more sidewalls 12 may include padding and/or provide a cushioned structure that may partially or fully support a pet within the bed space 14, such as when the pet rests against the sidewall.

The pet bed 10 may also include a bottom portion or base 16 that extends between the one or more sidewalls 12. The base 16 may include fabric or other material upon which a pet may position within the pet bed 10. In one example, all or a portion of the base 16 may be padded. Typically the base 16 will have a level planar surface. However, in some embodiments, the base 16 may include a contoured surface. A contoured surface may be dimensioned to provide portions upon which the pet may rest in different positions or orientations such that different portions of the body of the pet are at different elevations. In another example, the base 16 may include a contoured surface having raised portions between which portions of the body of the pet may position to promote a confined feeling. In some embodiments, the pet bed 10 may not include a base 16 and the sidewall 12 may be positioned on a surface, such as a ground, carpet, mat, or pad, that helps support the pet when within the bed space 14.

An interior side 48 of the one or more sidewalls 12 may preferably have a convex rounded profile that interfaces with the bed space 14. In some embodiments, one or more of the one or more sidewalls 12 may provide a concave space along the interior side 48 between a mid-portion 20 of the sidewall 12 and the base 16 within which a pet may snuggle.

The sidewall 12 may a soft or cuddly fabric, such as a plush fabric, along its outer surface. The fabric may be washable. In some embodiments, the outer surface may include a liner 22 provided as a case that may encase a sub-construction of the sidewall. The liner 22 may be provided in one or more removable sections via zippers, hook and loop, snaps, buttons, or other attachment members. Such a liner 22 may be removed for cleaning or replacement with another liner 22 as desired, e.g., replacement with a liner 22 having a different color, pattern, or material. The base 16 may be lined by the same or a different liner and/or material than utilized for the one or more sidewalls 12.

The pet bed 10 may have any suitable shape or size. As pets come in many shapes and sizes, the pet bed may similarly be provided in many shapes and sizes to comfortably receive and calm pets. For example, the pet bed 10 may include a sidewall 12 that extends around a round, oval, arcuate, square, rectangular, geometric, or non-geometric, e.g., free form, outer perimeter 24 and/or inner perimeter 26 (which may also be the outer perimeter of the bed space 14). It will be appreciated that the outer and inner perimeters 24, 26 need not define the same or similar shapes.

With particular reference to FIG. 2A, the pet bed 10 may include a passage or entrance 28 into the bed space 14. The entrance 28 may comprise a cutout through the sidewall 12 to ease entry and exit from the bed space 14. However, as exemplified in FIG. 2B, some embodiments may exclude a dedicated entrance 28, which may promote a more immersive feeling and/or improve containment of a juvenile or otherwise small pet within the bed space 14. In either configuration, pets physically able to negotiate the sidewall 12 may otherwise enter and exit the bed space 14 over the sidewall 12.

In various embodiments, the pet calming system 1 may include a covering or roof 30 for a pet bed 10, examples of which are illustrated in FIGS. 3-6.

Figure 3:
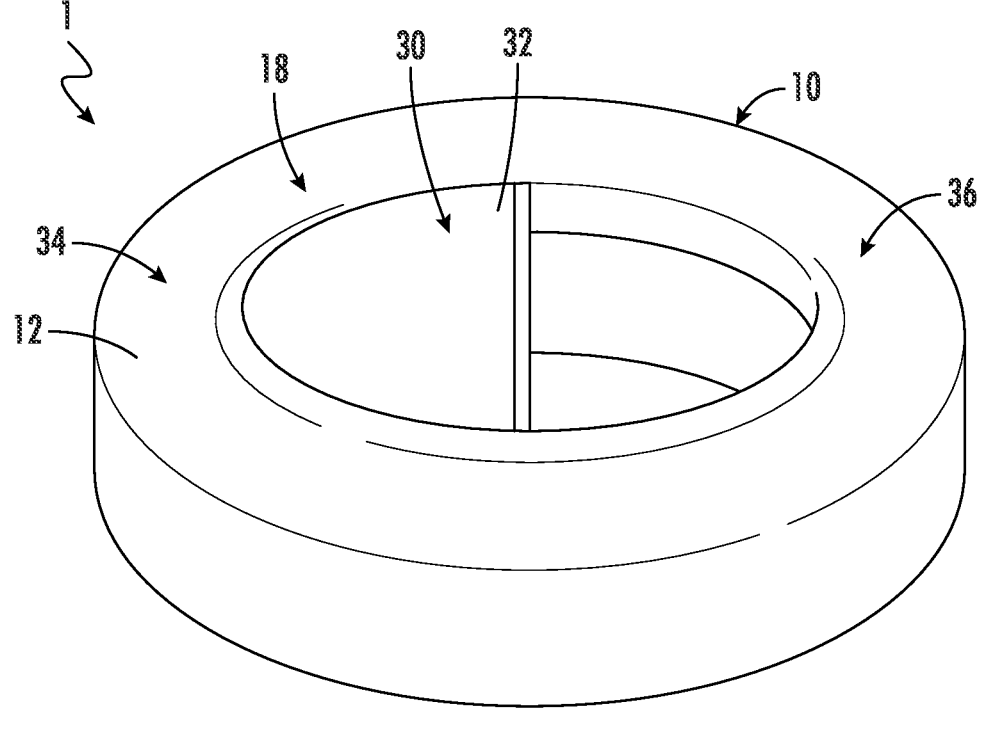
FIG. 3 illustrates a pet calming system including a pet bed having a roof according to various embodiments described herein.

In some embodiments, the roof 30 may comprise a partial roof or eave 32, an example of which is illustrated in FIG. 3. The eave 32 comprises a material that is integral, attached, or otherwise attachable along the sidewall 12, such as along an upper side 18. The attachment may be a threaded/seam connection or may be a selectively removable attachment, such as via a zipper, clips, snaps, hook and loop, buttons, or other attachment structure.

The eave 32 may comprise the same or a different material, such as a cuddly or plush fabric, as the sidewalls 12 or a liner thereof. The eave 32 may extend over substantially all or less than substantially all of the base 16. For example, the eave 32 may extend between opposing sides of the sidewall 12 from a first end 34 to a position between the first end 34 and a second end 36. In various embodiments, the eave 32 extends a distance from the first end 34 toward the second end 36 to cover between about 10% and about 90% of the base 16, such as between about 20% and about 80%, about 20% and about 70%, about 20% and about 50%, about 30% and about 80%, about 30% and about 70%, about 30% and about 60%, about 40% and about 80%, about 40% and about 70%, about 40% and about 80%, about 40% and about 70%, about 40% and about 60%, or about 20%, about 30%, about 40%, about 50%, about 60%, about 70%, about 80%, or about 90%.

Figure 4A:
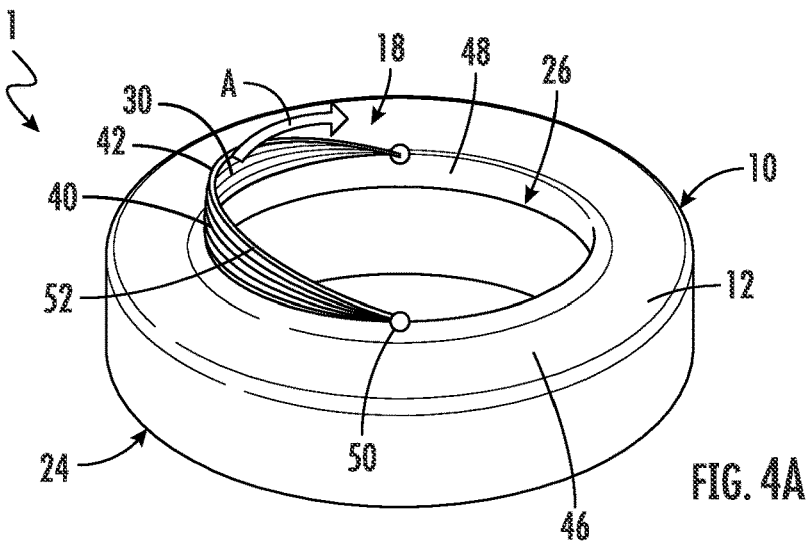
FIGS. 4A-4C illustrate a pet calming system including a pet bed having a retractable roof according to various embodiments described herein.
Figure 4B:
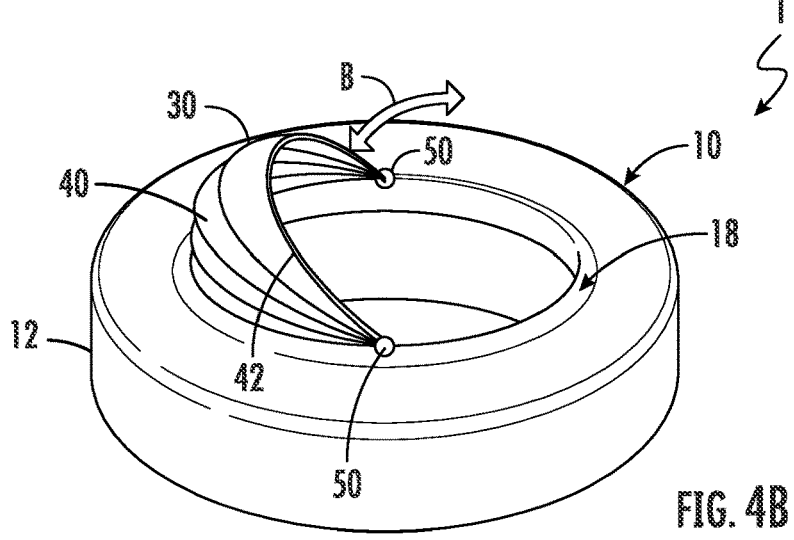
Figure 4C:
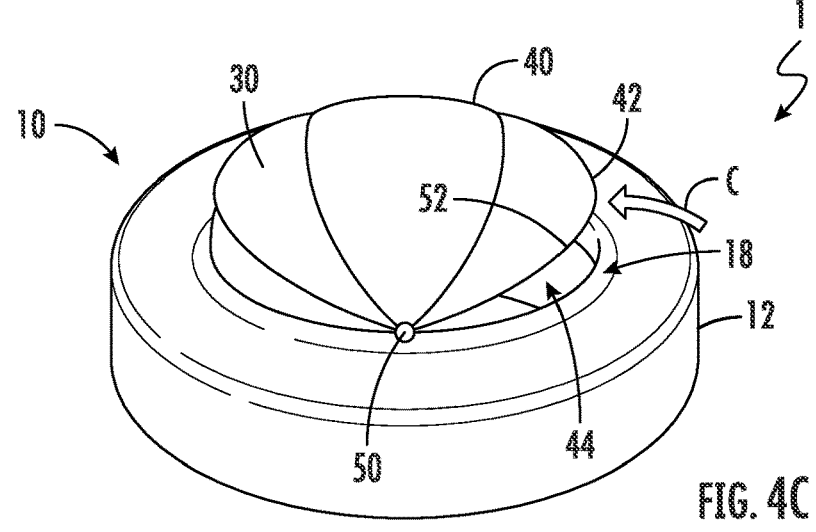

In some embodiments, the roof 30 may include a selectively retractable roof 40. FIGS. 4A-4C illustrate an example of a retractable roof 40 according to various embodiments. A retractable roof 40 may include a material that is integral, attached, or otherwise attachable along the sidewall 12, such as along an upper side 18. The attachment may be a threaded connection or may be a removable attachment, such as via a zipper, clips, snaps, hook and loop, buttons, or other attachment structure. The retractable roof 40 may comprise the same or different material, such as a cuddly or plush fabric, as the sidewalls 12 or a liner thereof.

As noted above, the pet bed 10 may have one or more sidewalls 12 defining various perimeter shapes of the pet bed 10. While the drawings are generally described with respect to pet bed 10 having a single arcuate sidewall 12 providing a round, circular, or oblong exterior and interior perimeter 24, 26, those having skill in the art will appreciate and easily translate the accompanying description provided herein to pet bed 10 embodiments having multiple sidewalls 12 defining other perimeter shapes. Thus, when reference is made herein to the sidewall 12, it is to be appreciated that the same description applies to embodiments including multiple sidewalls 12.

The retractable roof 40 may be configured to be pulled from the first end 34 toward the second end 36 of the pet bed 10 to partially or completely cover the bed space 14. For example, FIG. 4A illustrates the roof 30 stowed along the first end 34 in an open position. A lip 42 of the roof 30 may be pulled, arrow A, to a partially open position, for example, as shown in FIG. 4B. From the partially open position, the lip 42 may be pushed or pulled, arrow B, toward the first end 34 to another partially open position or the open position (FIG. 4A) or toward the second end 36 to another partially open position, as shown in FIG. 4C, which in some embodiments may comprise a closed position. For example, in one embodiment, the closed position completely encloses the bed space 14 and positions the lip 42 against the sidewall 12 at the second end 36 while, in another embodiment, the closed position positions the lip 42 partially toward the sidewall 12 at the second end 36, leaving an opening to allow the pet to enter and exit the bed space 14. In configurations wherein the closed position does not completely cover the bed space 14, the opening 44 between the lip 14 sidewall 12 may have a wedge shape or other shape in a partially open or closed position. From the closed position, the lip 42 may be pushed, arrow C, toward the first end 24 to translate the retractable roof 40 to a partially open position or an open position. The lip 42 may pivot from opposing sides of the sidewall 12, which may include pivoting from an exterior side 46 of the sidewall 12, upper side 18 of the sidewall 12, or interior side 48 of the sidewall 12. In the illustrated embodiment, the retractable roof 40 pivotably couples to the sidewall 12 at pivots 50 positioned along the upper side 18 of the sidewall 12.

In some embodiments, the retractable roof 40 or lip 42 thereof may include or associate with a rigid structure for grasping and/or supporting the roof 30. For example, the retractable roof 40 may include a frame member 52 that extends along the lip 42. The frame member 52 may be attached to the pivot 50, e.g., along upper sides 18, interior sides 48 (upper, lower, or mid portions), or exterior sides 46 (upper, lower, or mid portions) of opposed sides of the sidewall 12. Additional frame members 52 may also be attached at the pivot 50. In another or a further example, one side of the retractable roof 40 may snap, clip, hook, or otherwise selectively and releasably attach to the first end 34 of the pet bed 10, such as along the upper sides 18, interior sides 48 (upper, lower, or mid portions), or exterior sides 46 (upper, lower, or mid portions) of the sidewall 12.

As introduced above, the retractable roof 40 may include one or more frame members 52. The frame members 52 may be configured to support the roof 30 in a raised position relative to the upper side 18 of the sidewall 12. A frame member 52 may be attached to the pivots 50 to provide a rigid lip 42, for example. Some embodiments may include one or more additional frame members 52 that may similarly attach to the pivots 50 or elsewhere. Frame members 52 may be exposed or encased in a roof lining. Frame members 52 may have arcuate or curved profiles, e.g., as illustrated, linear profiles to provide a flat roof, or profiles having one or more bends or angles, e.g., resembling a perimeter of a bisected or other portion of a geometric or non-geometric shape. Frame members 52 may fan out from the pivot 50 when the retractable roof 40 is transitioned from the open position toward the closed position. The frame members 52 may approximate when the frame members 52 transition from a closed or partially open position toward the open position. The frame members 52 may be arranged to provide an accordion contour along the roof 30 such that the roof 30 folds between frame members 52 when transitioned toward the open position. The retractable roof 40 may also include a fabric having a foldable or accordion-like folding configuration, e.g., the fabric may be biased to fold into a particular folded configuration when the retractable roof 40 is opened. In one example, the retractable roof does not include frame members 52 or only includes a frame member along the lip 42.

The retractable roof 40 may utilize other configurations. For example, a retractable roof 40 may be configured to slide from an open position to a closed or partially open position, e.g., along rails. In one embodiment, the retractable roof 40 is coupled to the pet bed 10 by hinges to pivot the roof 30 over the bed space 14. In another embodiment, the pet bed 10 includes a roof 30 that is stationary or that does not retract.

In one such embodiment, the roof 30 includes a raised profile such that a portion of the space defined by the roof 30 is above the upper side 18 of the sidewall 12. In one example, the roof 30 may include frame members as described herein. In a further example, the roof 30 may be raised relative to the sidewall 12 similar to the retractable roof 40 described with respect to FIGS. 4A-4C.

In one embodiment, the roof 30 feature may be provided as a modular accessory that may be assembled onto the pet bed 10. In one example, a roof 30 comprising a retractable roof 40 may include a frame member 52 extending along a lip 42. The frame member 52 may be attached to a pivot 50, e.g., along upper sides 18, interior sides 48, exterior sides 46, inner perimeter 24, or outer perimeter 26 of opposed sides of the sidewall 12. Additional frame members 52 may be also be attached to the pivot 50. In another or a further example, one side of the roof 30 may snap or otherwise attach to the first end 34 of the pet bed 10, such as along the upper side 18 of the sidewall 12. The lip 42 may be manipulated to move the roof 30 toward a second end 36 of the pet bed 10 in a manner similar to that described with respect to FIGS. 4A-4C. In one embodiment, the roof 30 may be provided on a mat, frame, or stand that supports the roof 30 and thereby position the roof 30 over the bed space 14 of the pet bed 10. Such a roof 30 may be dimensioned to attach or contact the sidewall 12 or may be spaced apart from the sidewall 12. For example, a roof 30 may include a mat having one or more support columns that support a fixed or retractable roof 40 material. The roof 30 may be similar in operation as those described elsewhere herein. The pet bed 10 may be positioned on the mat to provide additional anchoring of the roof 30.

Figure 5A:
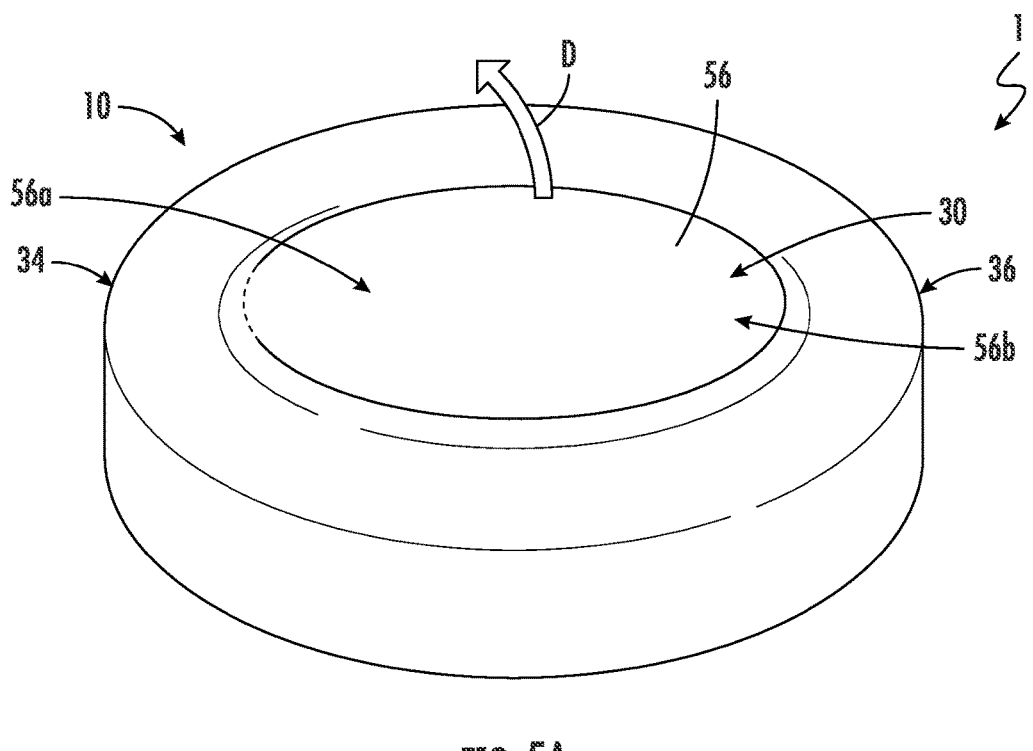
FIGS. 5A & 5B illustrate a pet calming system including a pet bed having a retractable roof flap according to various embodiments described herein.
Figure 5B:
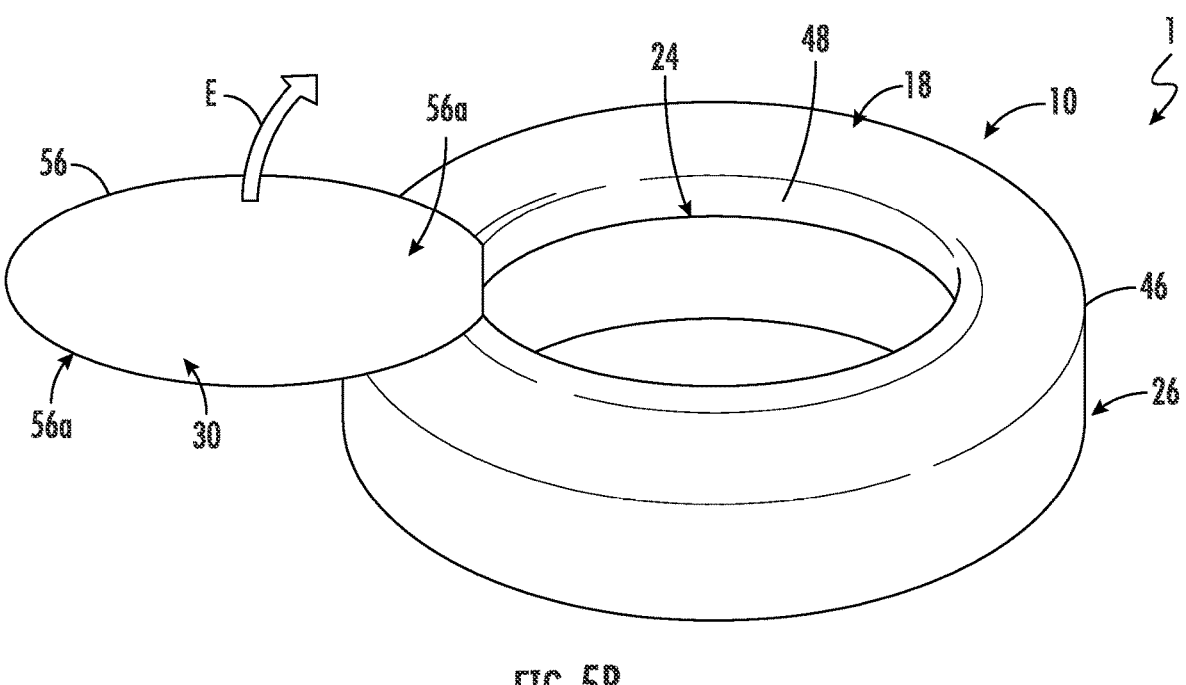

With reference to FIGS. 5A & 5B, in various embodiments, a pet calming system 1 may include a pet bed 10 having a roof 30 comprising a retractable roof 40 that includes a roof flap 56. The flap 56 may be integral, attached, or otherwise attachable along to the pet bed 10 along at first end 34. Attachment may be by via snaps, buttons, hook and loop, clips, or other attachment structures. For example, the flap 56 may attach to the first end 34 along the upper side 18 of sidewall 12, as shown, or along an interior side 48 or exterior side 46 of the sidewall 12. The flap 56 may include a material extendable over all or a portion of the bed space 14. In various embodiments, the flap 56 may comprise a cuddly or plush fabric. The flap 56 may be configured to transition between an open position and one or more closed positions and/or fully closed position.

FIG. 5A illustrates the flap 56 in a closed position wherein the flap 56 is extended over the bed space 14 with an attached end 56a of the flap 56 positioned at the first end 34 of the pet bed 10 and a detached or free end 56b of the flap 56 posited at the second end 36 of the pet bed 10.

FIG. 5B illustrates the flap in the open position wherein the free end 56b of the flap 56 has been pulled back (arrow D, FIG. 5A) over the attached end 56a of the flap 56 to reveal the bed space 14. In the closed position, the free end 56a may be pulled (arrow E, FIG. 5B) toward the second end 36 to transition the flap 56 to a partially open or open position.

Figure 6:
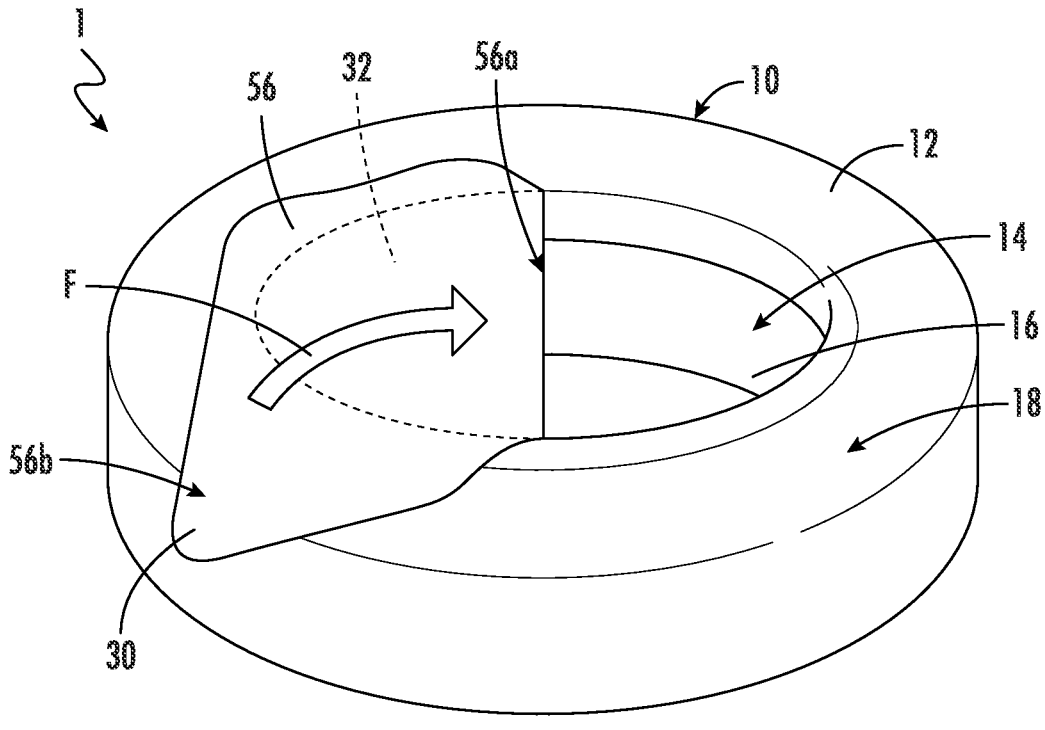
FIG. 6 illustrates a pet calming system including a pet bed having a retractable roof flap according to various embodiments described herein.

FIG. 6 illustrates another variation wherein the pet calming system 1 includes a pet bed 10 having a roof 30 in an eave 32 configuration, similar to that described with respect to FIG. 3, wherein the eave 32 also includes a retractable roof flap 56 comprising an additional expanse of material extending from an attached end 56a to a free end 56b. The flap 56 may be selectively extended (arrow F) to further cover the bed space 14 in a manner similar to that described with respect to FIGS. 5A & 5B.

With reference to FIGS. 5A-6, the flap 56, in various embodiments, may include additional attachment structures to attach along the sidewall 12 in closed or partially open position. For example, the free end 56b of the flap 56 and the sidewall 12 may include attachment structures such as snaps, buttons, hook and loop, clips, or other attachment structures configured to couple the free end 56b to the sidewall 12 at one or more locations. In some embodiments, the flap 56 may be utilized as a blanket in addition to or rather than being configured for use as a roof 30. For example, the flap 56 may be pulled over a pet within the bed space 14. In one example, the flap 56 may be weighted, e.g., about 0.25 lb to about 2 lb per square foot, to position over a pet and apply a light comforting pressure.

As introduced above with respect to FIG. 1, and with further reference to FIGS. 7A-7E, in various embodiments, the pet calming system 1 may include a pet bed 10 and a breathing device 60 configured to simulate breathing along one or more portions of the sidewall 12. Breathing may be simulated by expanding and contracting the size of the sidewall 12 along at least the interior side 48, increasing and decreasing the firmness along an interior side 48 of the sidewall 12, or translating a portion of the interior side 48 of the sidewall 12 toward and away from the bed space 14. For example, the breathing device 60 may include a pulsating bag or inflatable bladder 62 that imitates maternal breathing along the interior side 48 of the pet bed 10.

Figure 7A:
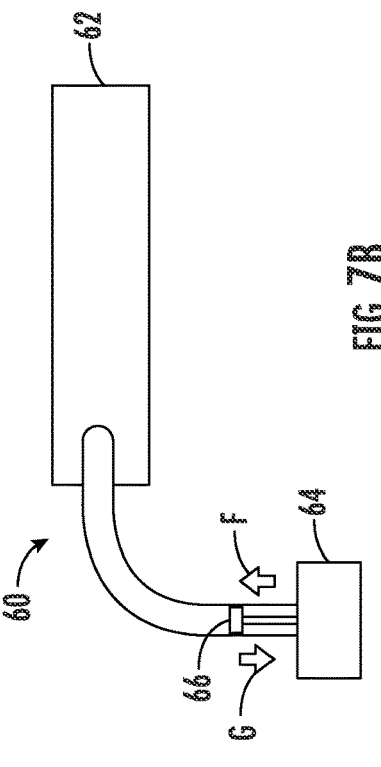
FIG. 7A illustrates a pet calming system including a breathing device according to various embodiments described herein.

In one example, as generally illustrated in FIG. 7A, the breathing device 60 comprises a bladder 62, which is to be understood to include one or more bladders 62, within which fluid may be retained. The bladder 62 may comprise a flexible material, stretchable material, bendable material, foldable material, elastic material, and/or a material structured in an expandable and/or collapsible configuration, e.g., a plastic, elastomeric, or rubberized fabric bag.

A pump 64 may be operatively coupled to the bladder 62 to transfer fluid into and/or out of the bladder 62. The pump 64 may comprise any suitable pump 64 such as a positive displacement pump 64 that pumps fluid into the bladder 62. The pump 64 and/or one or more valves (not shown) may also be fluidically coupled with the bladder 62 and be operable to release the fluid thereafter. In one example, the pump 64 may include a rotary pump that rotates to transfer fluid from a first side of the pump 64 into the bladder 62 to simulate inhalation. A portion of the rotation, reversal of rotation, or a valve may also allow fluid to transfer from the bladder 62 back to the first side of the pump 64 to simulate exhalation prior to the pump transferring fluid back into the bladder 62 to simulate inhalation. In another example, the bladder 62 is fluidically coupled to a supply of compressed fluid that may be released into the bladder 62 by operation of a valve, e.g., controlled by the controller. The pump 64 may pump fluid into the fluid chamber to supply the compressed fluid. One or more valves may also be used to allow fluid to be transferred out of the bladder 62 to simulate exhalation.

Figure 7B:
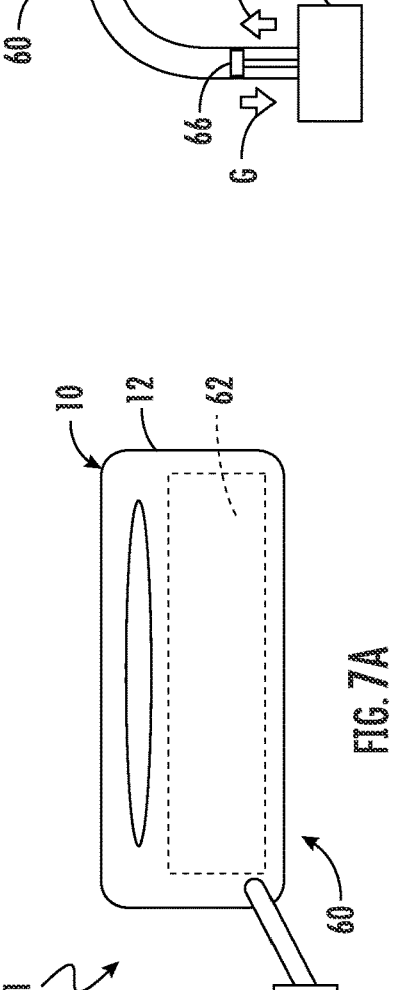
FIGS. 7B-7D illustrate various breathing device features according to various embodiments described herein.

In one example, the pump 64 includes a moveable diaphragm 66 fluidically coupled to the bladder 62 that translates or otherwise displaces fluid to increase or decrease pressure within the bladder 62, e.g., FIG. 7B. Actuation of the diaphragm 66 along a path in a first direction, arrow G, may increase pressure causing the bladder 62 to increase in size by expanding, stretching, unfolding, or otherwise to simulate inhalation. Actuation of the diaphragm 66 along the path in a second direction, arrow H, typically opposite of the first direction, may cause the bladder 62 to decrease in size by contracting, collapsing, folding, returning to a prestretched configuration, or otherwise by decreasing pressure within the bladder 62 to simulate exhalation.

Figure 7E:
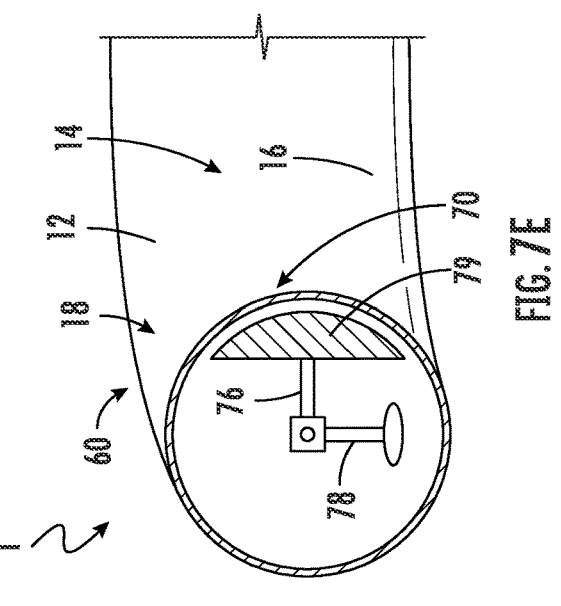
FIG. 7E illustrates a pet calming system include a pet bed shown in partial cross-section and a breathing device according to various embodiments described herein.
Figure 7D:
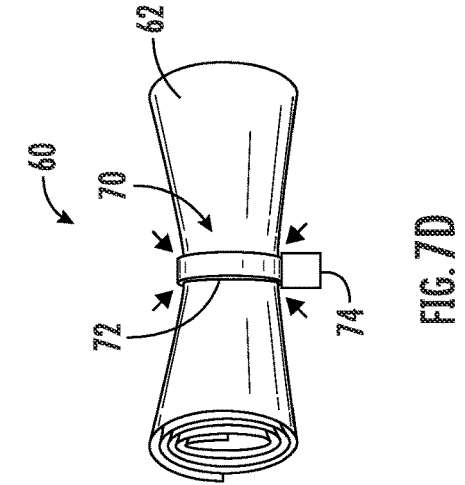
Figure 7C:
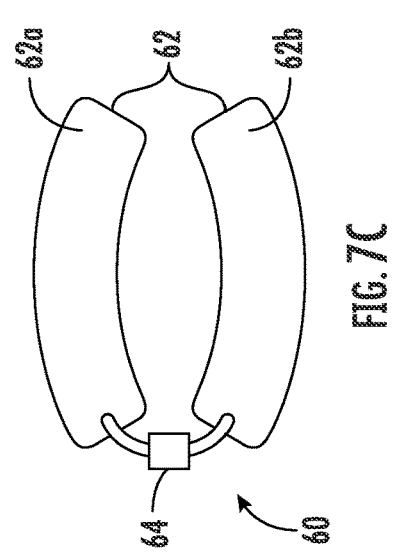

With reference to FIG. 7C, in one embodiment, the bladder 62 includes two or more fluidically coupled chambers 62a, 62b and the pump 64 is configured to transfer fluid between the chambers 62a, 62b to reciprocally increase and decrease fluid volume and/or pressure within the chambers 62a, 62b by transferring fluid therebetween. In one example, the pump 64 may include a translatable diaphragm that translates between a fluid connection between chambers 62a, 62b to reciprocally increase and decrease available volume and/or pressure in the respective chambers 62a, 62b to simulate inhalation with a first coupled chamber 62a while simulating exhalation with a second coupled chamber 62b. However, is some embodiments, the first coupled chamber is positioned along or adjacent to the interior side 48 of the sidewall 12 to simulate breathing while the second coupled chamber 62b is not positioned adjacent to the interior side 48 of the sidewall 12 and is not used to simulate breathing and acts as a fluid reservoir.

In one embodiment, the breathing device 60 comprises a volume modification device 70 configured to modify the available fluid volume within a bladder 62. The volume may be reduced, for example, by constricting and/or compressing a portion of the bladder 62 or fluidically coupled fluid reservoir, which may be internal or external to a sidewall 12, such that when the available volume is reduced, the bladder 62 increases in size or firmness to simulate inhalation and when the bladder 62 is released or compression is otherwise reduced to increase the available volume, the size or firmness of the bladder 62 decreases to simulate exhalation. In one example, the volume modification device may include a belt 72 that wraps around a portion of the bladder 62. An actuator or motor 74 may be operable to tighten the belt 72 to constrict and thereby compress the bladder 62 and sequentially loosened the belt 72 to release the bladder 62, as generally depicted in FIG. 7D, to simulate breathing. As introduced above, in one example, the volume modification device 70 may also constrict or compress a fluidically coupled fluid reservoir (not shown) to transfer fluid into and out of the bladder 62 and may therefore be considered a pump 64.

In one example, the volume modification device 70 includes one or more actuators configured to compress one or more objects, such as plates or arms, against the bladder 62 or fluidically coupled fluid reservoir, which may be internal or external to a sidewall 12, to decrease available volume or otherwise increase pressure and/or stress to other portions of the bladder 62 and then sequentially release compression to increase the available volume, thereby modifying size and/or firmness of the bladder 62 to simulate breathing. As noted above, the bladder 62 may include a collapsible, foldable, elastomeric, and/or stretchable material such that increases in fluid pressure or volume cause the bladder 62 to increase in size to simulate inhalation while decreases in fluid pressure or volume cause the bladder 62 to decrease in size to simulate exhalation.

In another example, the breathing device 60 includes a movable sidewall 12 that sequentially moves (arrow J) toward and away from the bed space 14 to simulate breathing. For example, as generally depicted in FIG. 7E, an actuator 76 may be utilized to move structure 79 against the sidewall 12 to move the interior side 48 of the sidewall 12 relative to the bed space 14. The actuator 76 may mount onto a frame 78 that extends through the sidewall 12. Thus, in various embodiments, the breathing device 60 may simulate breathing by expanding and contracting, increasing and decreasing the firmness, and/or causing inward and outward movement of the sidewall 12.

The operation of pumps or other fluid displacement devices, volume modification devices, actuators, and/or valves may be sequenced to simulate breathing to comfort a pet within the pet bed 10. Such breathing simulation may be particularly helpful for young pets, such as puppies, that are separated from their mother.

As introduced above, the breathing device 60 may simulate breathing along one or more sides or a full perimeter of the pet bed 10 along the interior side 48 of the sidewall 12. In another example, the breathing device 60 may be configured to simulate breathing along the base 16 of the pet bed 10 in addition to or alternatively to simulating breathing along a sidewall 12 of the pet bed 10. In embodiments including a bladder 62, the bladder 62 may be internal or within one or more sidewalls 12. For example, the bladder 62 may be directly adjacent to the interior side 48 or may be spaced apart, e.g., by stuffing. In another example, a bladder 62 may be integrated in a sidewall 12 or liner. For example, a sidewall 12 or liner thereof may include a pocket for a bladder 62 or may comprise a bladder 62 having a side that forms a portion of the interior side 48 of the sidewall. The side forming the a portion of the interior side 48 of the sidewall 48 may include a soft, cuddly, and/or plush material. In one example, the bladder comprises a fluidically sealable elastomeric fabric.

In various embodiments, simulation of breathing via operation of the breathing device 60 may be selectively initiated and terminated by a user, e.g., via a user interface.

Figure 8:
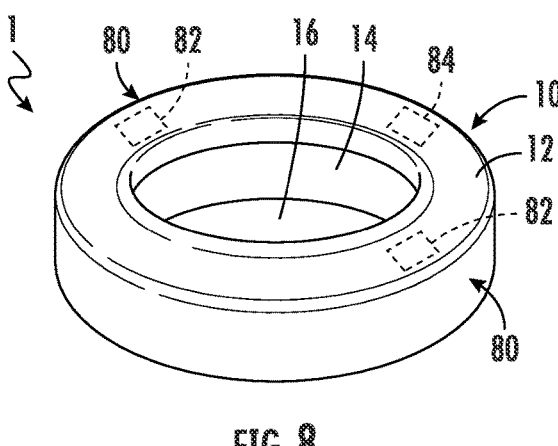
FIG. 8 illustrates a pet calming system including a pet bed and a sound generator according to various embodiments described herein.

As introduced above with respect to FIG. 1, and with reference to FIG. 8, in various embodiments, the pet calming system 1 includes a pet bed 10 having or incorporating a sound generator 80 configured to output soothing sounds. The sound generator 80 may include a speaker 82 positioned within the sidewall 12 or base 16 to direct sound into the bed space 14. Multiple speakers 82 may be used to provide a full or surrounding sound. In one example, the sound generator 80 may be provided externally to the sidewall 12 or base 16 and be positionable to direct sound into the bed space 14. The sound generator 80 may be configured to output soothing sounds such as white noise or breathing sounds. In some embodiments, the sound generator 80 may be configured to output music, human voices, user recorded sound tracts, heartbeats or pulsed beating.

In one embodiment, the sound generator 80 may initiate or modify sound output in response to movement and or sound within the bed space 14. For example, the pet bed 10 may incorporate one or more internally or externally positioned motion or sound sensors 84 that detect a pet within the bed space 14. Sound output may initiate upon sensors 84 detecting sound or motion. The sound generator 80 may operate according to an algorithm designed to sooth the pet. The algorithm may include predefined motion and/or sound frequency, duration, amplitude, or location ranges and/or thresholds that when detected result in the sound generation device 80 maintaining or modifying sound output parameters. In one example, the sound generator 80 may output white noise when the sensors 84 detect sound or motion within predefined ranges or thresholds and discontinue output of white noise or modify output parameters (e.g., volume, frequency, soundtrack, etc.). In one example, when sensors 84 detect restless motion or whining, e.g., sounds within a frequency range of pet whining, the sound generator 80 may be configured to output white noise. The sound output may be responsive wherein volume output and/or amount of low frequency sound increases with detection of louder or continued whining or prolonged restless movement. In one example, sound may be set to be output for a period of time determined by a user or may discontinue upon sensors 84 failing to detect sound or movements within predefined ranges or above threshold settings (e.g., sound or motion frequency, duration, amplitude, location, etc.) indicating that the pet is not soothed or relaxed. In some embodiments, the sound generator 80 is not responsive to motion or sound and the sound generator 80 or controller does not incorporate sensors 84 for utilization in sound output operations. In various embodiments, sound output may be selectively initiated and terminated by a user, e.g., via a user interface. In some embodiments, the ranges or threshold and/or predefined responses of the sound generator 80 to detection of sound or motion within the ranges or above or below thresholds may be modified by a user, e.g., via a user interface, to create customized algorithms.

Figure 9A:
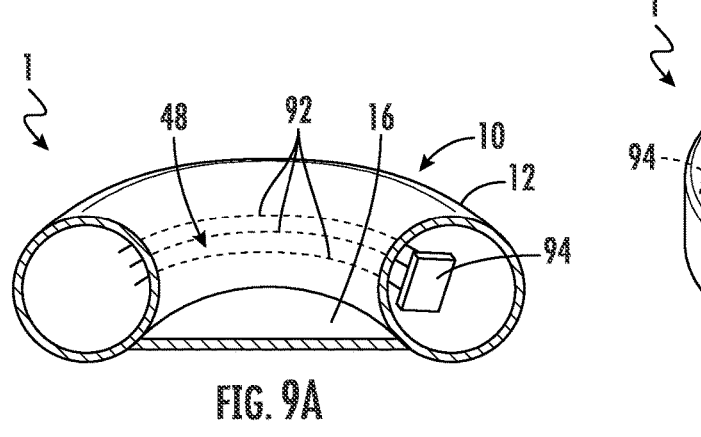
Figure 9B:
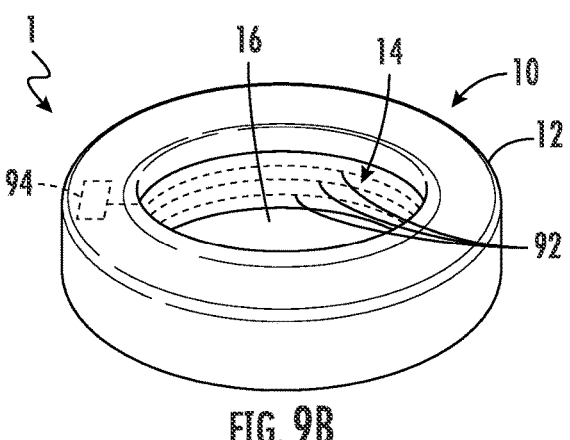

As introduced above with respect to FIG. 1, and with reference to FIGS. 9A & 9B, in various embodiments, the pet calming system 1 may include a pet bed 10 having one or more heaters 90 configured or positioned to provide heat to a sidewall 12 or portions thereof. The heater 90 may comprise any suitable heater. For example, the heater 90 may comprise an electric, oil, water, radiant, ceramic, or other heater configured to provide heat to the pet bed 10. The heater 90 is preferably integrated with the pet bed 10 to provide heat along one or more portions of the interior side 48 of the sidewall 12, roof 30, or base 16. In various embodiments, the heat provided may be from about 70° F. to about 104° F., such as between 70° F. and about 90° F., between about 80° F. and about 100° F., or between about 90° F. and about 102° F.

In the illustrated embodiment, the pet calming system 1 includes a heater 90 configured to generate heat along heating elements 92 that extend along the pet bed 10, e.g., heating elements 92 extending along or between an interior side 48 of the sidewall 12, which may include a liner, the base 16, or portion thereof.

In FIG. 9A, the heater 90 includes an electric heater including a current regulator 94 configured to regulate current conducted along one or more wire heating elements 92 that extend through the sidewall 12 along the interior side 48 to generate heat. Additionally or alternatively, heat may be provided by the heater to other location of the pet bed 10. For example, FIG. 9B depicts wire heating elements 94 extending along the base 16 of the pet bed 10. In any of the above or another embodiment wherein the pet bed 10 includes a roof, the heater may be configured or positioned to provide heat along the roof. For example, heating elements, may extend through the roof. As noted above, in some embodiments, a flap may be utilized as a blanket. In one example, the flap may include one or more heating elements 94 to generate heat along the flap.

In one example, the heater 90 may include an electric heater configured to heat a fluid. A pump, which may include a same or different pump than may be utilized for transferring fluid into a breathing bladder, may be utilized to move heated fluid through one or more fluid channels, such as fluid channels extending along or between the sidewall 10, base 14, a sidewall liner, or portion thereof. In a further or another example, when so equipped, fluid channels for transporting heated fluid may extend along a bladder or roof, which may include a flap. In one embodiment, the heater 90 is configured to heat a liquid that may be pumped along fluid channels. The fluid may include water or oil, for example. In one embodiment including a breathing bladder, the bladder may be jacketed with fluid channels for receiving heated fluid. In another embodiment, one or more pumps may supply the bladder with heated fluid, such as gas or liquid, to increase and decrease the size and/or firmness of the bladder while at the same time providing heat to the pet bed 10.

In various embodiments, heating via operation of the heater 90 may be selectively initiated and terminated by a user, e.g., via a user interface.

Figure 10A:
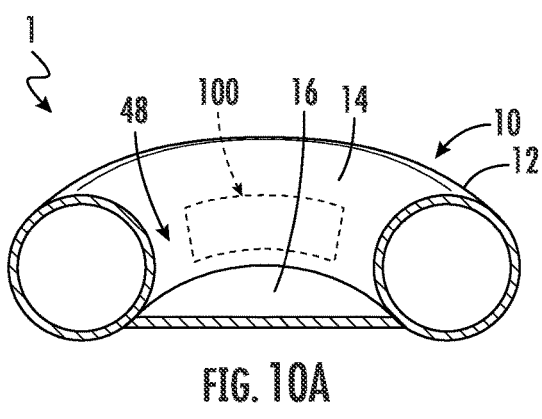
FIG. 10A illustrates a pet calming system including a pet bed shown in cross-section view and a massage device according to various embodiments described herein.
Figure 10B:
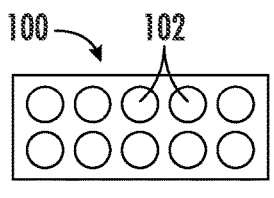
FIG. 10B illustrates a massage device according to various embodiments described herein.

As introduced above with respect to FIG. 1, and with reference to FIGS. 10A & 10B, in various embodiments, the pet calming system includes a pet bed 10 that may comprise or incorporate a massage device 100 configured to provide massaging motion along all or a portion of the interior side 48 of the sidewall 12 and/or base 16. The massage device 100 may be configured to output one or more massaging motions or patterns such as vibration, rhythmic wave motion, twisting, or kneading. For example, one or more sets of fingers/pins 102 may be positioned within a sidewall 12 or base 16 and be configured to moved up-and-down in a kneading motion along the interior side 48 of the sidewall 12 or base 16. In one example including a breathing bladder 62, the massage device 100 is positioned between the bladder 62 and a lining of the sidewall to provide massaging motion along the interior side 48 of the sidewall 12. In some embodiments, the massage device 100 may be attached to a frame that extends through the sidewall 12 to provide support for the massage device 100 and its massage operations. In some embodiments, the massage device 100 may include multiple settings defining massage motion parameters such as duration, depth, speed, and/or pattern of massage action.

In various embodiments, massaging via operation of the massage device 100 may be selectively initiated and terminated by a user, e.g., via a user interface. In a further embodiment, the user may utilize the user interface to define settings of the massage device.

Figure 11:
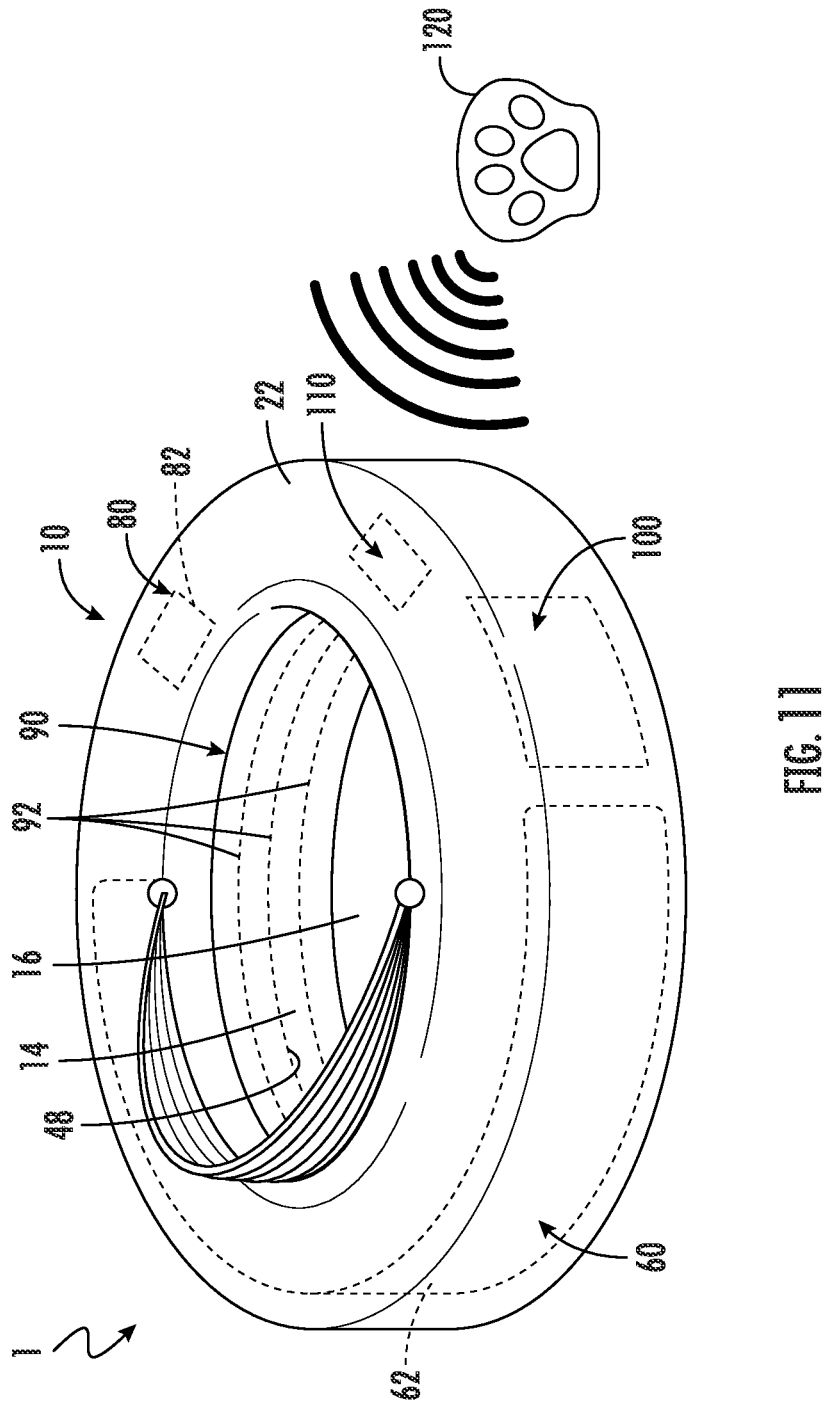
FIG. 11 illustrates a pet calming system including a pet bed and various accessory features including a retractable roof, breathing device, sound generator, heater, and massage device according to various embodiments described herein.

FIG. 11 illustrates a pet calming system 1 including a pet bed 10 equipped with a breathing device 60, sound generator 80, heating device 90, and/or massage device 100. The breathing device 60 includes a bladder 62 that extends around a portion of the sidewall 12 that may expand and contract to simulate breathing along the interior side 48 of the sidewall 12. The sound generator 80 incudes a speaker 82 positioned within the sidewall 12. The heater 90 includes heating elements 92 that extend along the interior side 48 of the sidewall 12 to provide heat therealong. The massage device 100 is positioned within the sidewall 12 to provide massaging motion along the interior side 48 of the sidewall 12. An internally positioned controller 110 is also provided for controlling operations of the breathing device 60, sound generator 80, heating device 90, and massage device 100.

A user interface 120 comprising a dedicated remote 122 may be used to wirelessly interface with the controller 110. In one example, one or both of a control panel along an exterior surface of the pet bed 10 and/or a mobile app executable on a user device (e.g., smart phone, tablet, or computer) may provide a user interface 110 to interface with the controller 110 in addition to or instead of the dedicated remote 122. In a further embodiment, the pet bed 10 may include a roof, which may be fixed, retractable, or comprise and eave and/or flap as described elsewhere herein.

With reference again to FIG. 1, the pet bed 10 may include a controller 110 configured to control the operations of the pet bed 10. The controller 110 may include or be configured to be in signal communication with a user interface 120 for interfacing a user with the operations of the controller 110. For example, the controller 110 may include a control box, control panel, and/or remote configured to provide a user interface 120 to interface a user with the operations of the pet calming system 1. A control box or panel may be provided on the pet bed 10 or may be provided via a wired or wireless connection with the controller 110. The controller 110 may comprise one or more controllers, each able to control one, more, or a portion of operations of the accessory features. A remote may include a dedicated remote or may be provided with connection with a mobile app that may be operated on a user device, such as a smart phone or tablet.

The controller 110 may be configured to control operations of the breathing device 60. For example, the controller 110 may be operable to initiate or terminate power delivery to one or more pumps, valves, or volume modification devices and/or control operational parameters thereof. The controller 110 may be operable to control operation parameters of the breathing device 60 such as controlling output of pumps, volume modification devices, or valve opening or closing. The controller 110 may be operable to modify operational parameters such as a simulated breathing rate or depth of breathing. For example, the controller 100 may include two or more defined, definable, or selectable breathing rate or depth settings that increase or decrease the sequential timing and/or duration of fluid pumping, operations of a volume modification device, and/or valve opening and closing. In various embodiments, a user, via a user interface 120, may selectively initiate or discontinue operation of the breathing device 60. In a further example, a user, via the user interface 120, may set or modify operation parameters such as the rate and/or depth of breathing. In a further example, a user using a user interface 120 may modify operation parameters such as selecting a duration of operation of the breathing device 60. In some embodiments wherein the pet bed 10 includes a breathing device 60 located at multiple locations of the pet bed 10, e.g., to simulate breathing along multiple portions of the interior side of the one or more sidewalls, and the corresponding portions of the breathing device 60 may be separately controlled, the controller 110 may selectively control the separately controllable portions of the breathing device 60. In one embodiment, a user using a user interface 120, a user may modify operation parameters by selecting from one or more predefined programs or custom programs defined by the user that specify one or more of breathing rate, depth, duration, and/or location. As described below, these or other programs may also be provided with control settings for operation parameters for sound generator 80 output, heater 90 output, and/or massage device 100 output, when included and so equipped.

The controller 110 may be configured to control operations of the sound generator 80. The controller 110 may be operable to initiate or discontinue sound output. In some embodiments wherein the pet bed 10 includes multiple speakers located at different portions of the pet bed 10, e.g., to output sound at multiple locations, and the speakers are separately addressable, the controller 110 may selectively control the operation parameters of the separately addressable speakers with respect to one or more of initiation of sound output, termination of sound output, sound volume, and/or duration. In some embodiments, the controller 110 may be operable to control operation parameters such as a sound volume, duration, and/or type of sound tract. The controller 110, for example, may include or access a data storage device loaded with various soundtracks that may be output by the sound generator 80. In some embodiments, the data storage device may be remote, in the cloud, or accessible via an internet connection and the controller 110 may include a wireless transceiver configured to wirelessly access the data storage device via a Wi-Fi or other wireless connection. In some embodiments, the controller 110 may be operable to allow a user, via a user interface 120, to control operation parameters of the sound generator 80 such as one or more of initiation of sound output, termination of sound output, sound volume, duration of sound output, and/or location of sound output. In a further example, a user using a user interface 120 modify operation parameters by selecting from one or more custom predefined programs or programs defined by the user that specify one or more of initiation of sound output, termination of sound output, sound volume, duration of sound output, type of soundtrack, and/or location of sound output. Type of soundtrack may include continuous or varied volume white noise, pulse or heartbeat, or white noise with heartbeat, for example.

The controller 110 may be configured to control operations of the heater 90. The controller 110 may be operable to modify operation parameters of the heater 90 including initiating or discontinuing heat output. As noted above, the heater 90 may include a temperature or current regulator for controlling operation temperature output. Such a temperature regulator may be part of the controller 110 or may be controlled by the controller 110. In some embodiments wherein the pet bed 10 includes separately addressable heater portions, the controller 110 may selectively control operation parameters of the separately addressable heater portions such as initiation of heat output, termination of heat output, temperature, and/or duration of heat output. In one example, a user using a user interface 120 may select operation parameters with respect to initiation of heat output, termination of heat output, temperature, duration, and/or one or more locations of heat output. In a further example, a user using a user interface 120 may modify operation parameters by selecting from one or more predefined programs or custom programs defined by the user that specify one or more operation parameters with respect to initiation of heat output, termination of heat output, temperature, duration, and/or one or more locations of heat output.

The controller 110 may be configured to control operations of the massage device 100. The controller 110 may be operable to modify operation parameters such as initiating or discontinuing massage output. As noted above, the massage device 100 may include one or more massage operations, such as vibrations or kneading. The controller 100 may be utilized to control operation parameters such as type of massage operation output by the massage device 100, duration, depth, speed, and/or pattern of massage action. In some embodiments wherein the pet bed 10 includes separately addressable portions of the massage device 100, e.g., output portions that output different or the same types of massage action, the controller 110 may selectively control the separately addressable portions with respect to operation parameters, such as initiation, termination, duration, depth, speed, pattern, and/or type of massage action, when so equipped. In one example, a user using a user interface 120 may select operation parameters, such as initiation, termination, duration, depth, speed, pattern, type of massage action, and/or location of massage action, when so equipped. In a further example, a user using a user interface 120 may select from one or more predefined programs or custom programs defined by the user that specify one or more operation parameters, such as initiation, termination, duration, depth, speed, pattern, type of massage action, and/or location of massage action, when so equipped.

Thus the controller 110 may be used to allow a user to control various operations of a pet calming system. For example, in embodiments including one or more of a breathing device 60, sound generator 80, heating device 90, and/or massage device 100, the controller 120 may provide a user interface 120 that allows the user to control various operation parameters of the various features such as one or more of breathing rate, duration, depth, and/or location; initiation of sound output, termination of sound output, sound volume, duration of sound output, and/or location of sound output; initiation of heat output, termination of heat output, temperature, duration, and/or one or more locations of heat output; and/or initiation of massage action, termination of massage action, duration of massage action, depth of massage action, speed of massage action, pattern of massage action, type of massage action, and/or location of massage action. The controller 110 may also include or access predefined programs or custom programs defined by the user that may be selected by the user that specify operation parameters for one or more of the features. In some embodiments, operation of the breathing device 60 and sound output of the sound generator 80 are optional and the user may turn off these functions. Similarly, in some embodiments, operation of a massage device 100 and/or heater 90, when included, may be optional and a user may select one or more of these features to be off during operation of one or more other features.

In some embodiments wherein the pet calming system 1 includes a retractable roof, the controller 110 may be configured to translate the roof between open, closed, or partially open positions. For example, a motor or actuator may couple to a roof frame member and be operable to translate the roof between open and closed or partially open positions. Using a user interface 120, a user may access the controller 110 to initiate translation of the roof.

The pet calming system 1 may be configured to couple to one or more internal or external batteries to provide power to the controller 110 and various features. In one embodiment, the battery is rechargeable. In some embodiments, an outlet may be provided on the pet bed or on wiring extendable from the pet bed to recharge the battery while installed in the pet bed. In some embodiments, the pet bed includes a power cable that connects to a residential power outlet.

The pet calming system 1 may include other or additional features such as a camera to allow a user to view the pet bed 10 and/or pet using the bed, e.g., using a dedicated device or mobile app. executed on a user device.

The pet calming system described herein may include hardware including or operatively associated with software stored in memory that is executable by hardware. For example, the pet bed and related systems and features thereof described herein may include a memory that stores instructions, and processor that executes the instructions to perform the operations described herein. The present disclosure may include dedicated hardware implementations including, but not limited to, application-specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the processes described herein may be intended for operation according to software programs running on a computer processor. Furthermore, software implementations can include but are not limited to, distributed processing or component/object distributed processing, parallel processing, or virtual machine processing that may be constructed to implement the operations described herein.

The present disclosure describes various systems, modules, units, devices, components, and the like. Such systems, modules, units, devices, components, and/or functionalities thereof may include one or more electronic processors, e.g., microprocessors, operable to execute instructions corresponding to the functionalities described herein. Such instructions may be stored on a computer-readable medium. Such systems, modules, units, devices, components, the like may include functionally related hardware, instructions, firmware, or software. For example, modules or units thereof, which may include generators or engines, may include a physical or logical grouping of functionally related applications, services, resources, assets, systems, programs, databases, or the like. The systems, modules, units, which may include data storage devices such as databases and/or pattern library may include hardware storing instructions configured to execute disclosed functionalities, which may be physically located in one or more physical locations. For example, systems, modules, units, or components or functionalities thereof may be distributed across one or more networks, systems, devices, or combination thereof. It will be appreciated that the various functionalities of these features may be modular, distributed, and/or integrated over one or more physical devices. It will be appreciated that such logical partitions may not correspond to the physical partitions of the data. For example, all or portions of various systems, modules, units, or devices may reside or be distributed among one or more hardware locations.

The present disclosure contemplates a machine-readable medium containing instructions so that a device connected to a communications network, another network, or a combination thereof, can send or receive voice, video or data, and to communicate over the communications network, another network, or a combination thereof, using the instructions. The instructions may further be transmitted or received over the communications network, another network, or a combination thereof, via the network interface device. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure. The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or re-organizing any of the disclosed steps, components, elements, features, aspects, characteristics, limitations, and the like, of the various non-limiting and non-exhaustive embodiments described in this specification.

Various elements described herein have been described as alternatives or alternative combinations, e.g., in lists of selectable actives, ingredients, or compositions. It is to be appreciated that embodiments may include one, more, or all of any such elements. Thus, this description includes embodiments of all such elements independently and embodiments, including such elements in all combinations.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" corresponds to "x and/or y" and refers to "x", "y", or both "x" and "y", whereas "either x or y" refers to exclusivity.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments could be modified, reduced, or enhanced without departing from the scope and spirit of the claims described below.

What is claimed is:

1. A pet calming system, the system comprising:
   a pet bed comprising:
      a base,
      one or more sidewalls positioned around a perimeter of the base and extending vertically to a location above the base, and
      a bed space defined by an interior side of the base and an interior side of the one or more sidewalls;
   one or more sensors configured to detect sound within the bed space;
   a breathing device configured to simulate breathing along at least a portion of the interior side of the one or more sidewalls;
   a sound generator configured to output sound into the bed space when the one or more sensors detect sound produced by a pet within the bed space corresponding to one or more of a predefined frequency, duration, or amplitude range or threshold indicating that the pet is not soothed or relaxed;
   a heater configured to provide heat along at least a portion of the interior side of the one or more sidewalls, base, or both; and a massage device configured to provide a massaging motion along at least a portion of the interior side of the one or more sidewalls.

2. The system of claim 1, further comprising a roof configured to extend over at least a portion of the bed space.

3. The system of claim 2, wherein the roof comprises an eave.

4. The system of claim 3, wherein the roof is pivotable over the bed space between an open position and one or more partially open positions and/or a closed position.

5. The system of claim 1, wherein the interior side of the one or more sidewalls is rounded toward the bed space.

6. The system of claim 1, wherein the one or more sidewalls or a liner thereof comprises a plush cleanable fabric.

7. The system of claim 1, wherein the breathing device comprises one or more inflatable bladders.

8. The system of claim 1, wherein the massage device comprises a plurality of fingers, and the massaging motion comprises the plurality of fingers moving up and down in a kneading motion.

9. The system of claim 1, wherein the output sound comprises white noise.

10. The system of claim 1, wherein the one or more sensors are further configured to detect movement within the bed space, wherein the sound generator outputs white noise responsive to sound or movement detected within the bed space by the one or more sensors.

11. The system of claim 1, further comprising a controller configured to control operations of the breathing device, sound generator, heater, and massage device.

12. The system of claim 11, wherein the controller is configured to receive instructions from a user interface that allows a user to selectively turn off the breathing device, sound generator, heater, and/or massage device.

13. The system of claim 11, wherein the controller is configured to receive instructions from a user interface that allows a user to define operation parameters of the breathing device, sound generator, heater, and/or massage device.

14. The system of claim 13, wherein the user interface comprises a dedicated remote.

15. The system of claim 13, wherein the user interface comprises a mobile application executable on a smart phone.

16. The system of claim 1, further comprising a rechargeable battery.

17. The system of claim 1, wherein the sound generator outputs white noise responsive to sound detected within the bed space by one or more sensors.

18. The system of claim 3, wherein the roof is pivotable over the bed space between an open position, a plurality of partially open positions, and a closed position.

19. The system of claim 7, wherein the massage device comprises a plurality of fingers, and the massaging motion comprises the plurality of fingers moving up and down in a kneading motion.

20. The system of claim 1, wherein the sound generator maintains or modifies sound output parameters of the output sound based on a frequency range or volume of the sound detected by the one or more sensors.

* * * * *